United States Patent
Giraud

(10) Patent No.: US 12,435,850 B2
(45) Date of Patent: Oct. 7, 2025

(54) LIGHT DEVICE FOR A MOTOR VEHICLE

(71) Applicant: VALEO VISION, Bobigny (FR)

(72) Inventor: Sylvain Giraud, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/687,926

(22) PCT Filed: Sep. 1, 2022

(86) PCT No.: PCT/EP2022/074357
§ 371 (c)(1),
(2) Date: Feb. 29, 2024

(87) PCT Pub. No.: WO2023/031341
PCT Pub. Date: Mar. 9, 2023

(65) Prior Publication Data
US 2024/0384851 A1    Nov. 21, 2024

(30) Foreign Application Priority Data
Sep. 3, 2021    (FR) ...................................... 2109225

(51) Int. Cl.
*F21S 41/33*    (2018.01)
*F21S 41/148*    (2018.01)
(Continued)

(52) U.S. Cl.
CPC ........... *F21S 41/334* (2018.01); *F21S 41/148* (2018.01); *F21S 41/153* (2018.01); *F21S 41/25* (2018.01); *F21W 2102/13* (2018.01)

(58) Field of Classification Search
CPC ...... F21S 41/334; F21S 41/148; F21S 41/153; F21S 41/25; F21W 2102/13
See application file for complete search history.

(56) References Cited

U.S. PATENT DOCUMENTS 8,920,011 B2    12/2014 Okuo
9,033,560 B2    5/2015 Puente et al.
(Continued)

FOREIGN PATENT DOCUMENTS

EP    2453167 A1    5/2012
EP    2597357 A1    5/2013
(Continued)

OTHER PUBLICATIONS

European Patent Office, International Search Report (with English translation) and Written Opinion of corresponding International Application No. PCT/EP2022/074357, dated Dec. 7, 2022.
(Continued)

*Primary Examiner* — Elmito Breval
(74) *Attorney, Agent, or Firm* — Valeo Vision

(57) ABSTRACT

The invention relates to a light-emitting device including a first light-emitting module and a second light-emitting module, the first light-emitting module including a first light source and a first optical device arranged to form a first light beam, the second light-emitting module including a second light source and a second optical device arranged to form a second light beam, the second light-emitting module including a third light source and a third optical device including a deflector and a scattering surface, the deflector being arranged to deflect light emitted by the third light source toward the scattering surface, the light-emitting device including a control unit arranged to turn on the third light source when the first light source is turned on.

12 Claims, 2 Drawing Sheets

(51) Int. Cl.
  *F21S 41/153* (2018.01)
  *F21S 41/25* (2018.01)
  *F21W 102/13* (2018.01)

(56) References Cited

U.S. PATENT DOCUMENTS 11,815,239 B2 11/2023 Imamura et al.
12,270,520 B2 4/2025 Hayashi

FOREIGN PATENT DOCUMENTS

| EP | 3616994 A1 | 3/2020 |
| FR | 3086033 A1 | 3/2020 |
| JP | 2011129283 A | 6/2011 |
| JP | 2013114744 A | 6/2013 |
| JP | 2018032512 A | 3/2018 |
| JP | 2018045907 A | 3/2018 |
| JP | 2019212428 A | 12/2019 |
| JP | 2020191276 A | 11/2020 |
| JP | 2021026959 A | 2/2021 |

OTHER PUBLICATIONS

Japan Patent Office, Decision of Grant (with English translation) of corresponding Japanese Patent Application No. 2024-513984, dated Dec. 3, 2024, 5 pages.

LIGHT DEVICE FOR A MOTOR VEHICLE

TECHNICAL FIELD

The invention relates to the field of automotive lighting. More precisely, the invention relates to a light-emitting device for a motor vehicle.

BACKGROUND OF THE INVENTION

So-called dual-function light-emitting devices, which comprise a plurality of light-emitting modules sharing the same projecting optical device and which are thus capable of selectively performing a plurality of functions through this projecting optical device, are known. A light-emitting device comprising a plurality of light sources is in particular known, each light source being associated with a collector comprising a reflective surface arranged to collect and reflect light emitted by this light source, the light-emitting device comprising a lens arranged to project the light reflected by each collector into a light beam formed by an image of the reflective surface of this collector.

These light-emitting devices thus allow various lighting functions, such as high-beam and low-beam lighting functions, to be performed. However, these two functions require separate light sources, certain of which cannot be activated for both functions, the low-beam function generally being supplemented by other light sources of the light-emitting device to form the high-beam function. It thus follows that only part of the projecting optical device is illuminated when the low-beam function is activated, while the entire projecting optical device is illuminated when the high-beam function is activated.

The fact that the illuminated appearance of the light-emitting device differs depending on the activated lighting function is problematic, and a recurring need to achieve a light-emitting device with an illuminated appearance that remains constant and uniform irrespective of its operating mode is thus not met. It will be noted that the same problem arises with other exclusive light-emitting functions, such as low-beam and DRL functions, or DRL and direction-indicator functions (DRL standing for daytime running light).

SUMMARY OF THE INVENTION

There are solutions allowing this need to be met, but they are unsatisfactory.

A first solution consists in deflecting some of the light generated by the light source performing one of the functions to the light-emitting module performing the other of these functions. On the one hand, this solution requires the two light-emitting modules to be close to each other, and can thus for example be implemented when the collectors of these modules are placed one above the other. However, this solution is incompatible with a light-emitting device in which the collectors are placed adjacently, for example so that the light sources can be mounted on the same support. On the other hand, this solution implies a loss of efficiency for the light-emitting function some of the light of which is deflected, this being undesirable.

Another solution consists in simultaneously turning on the two light sources, one with a nominal brightness to perform one of the light-emitting functions, and the other with a far lower brightness. This solution is unsatisfactory when one of the light-emitting functions is a high beam, the minimum brightness level required to obtain an acceptable illuminated appearance while preventing the light beam thus formed from generating dis-comfort glare being difficult to achieve with current electronic solutions.

This is thus the context of the invention which aims to meet the aforementioned need while overcoming the drawbacks of the various listed solutions.

To these ends, the invention relates to a light-emitting device of a motor vehicle, the device comprising a first light-emitting module and a second light-emitting module, in which the first light-emitting module comprises a first light source and a first optical device arranged to receive light emitted by the first light source and to form, from this light, a first light beam, and in which the second light-emitting module comprises a second light source and a second optical device arranged to receive light emitted by the second light source and to form, from this light, a second light beam distinct from the first beam, characterized in that the second light-emitting module comprises a third light source and a third optical device comprising a deflecting member and at least one scattering surface, the deflecting member being arranged to receive light emitted by the third light source and to deflect that light toward said scattering surface, the light-emitting device comprising a control unit arranged to control each of the light sources and to turn on the third light source when the first light source is turned on.

Thus, according to the invention, a third light source is added to the light-emitting module intended to perform one of the light-emitting functions, this third light source being dedicated to giving this light-emitting module an illuminated appearance when the light-emitting module intended to perform the other of the light-emitting functions is activated. The light emitted by this third light source is not bright enough to generate discomfort glare, insofar as most or even all of this light is suitably deflected by the deflecting member to one or more scattering surfaces, which disperse this light. Regardless of the light-emitting function performed, it is thus ensured that each of the light-emitting modules will have a uniform and constant illuminated appearance. Moreover, the light emitted by the first and second light sources is entirely dedicated to the production of the first and second light beams, and hence no loss of efficiency is observed. Lastly, the invention can be implemented regardless of how the light-emitting modules are arranged with respect to one another. In particular, it could be envisioned to arrange all of the light-emitting modules in a single light-emitting device equipped with a single projecting element defining a plurality of segments that each participate in one of the optical devices of the modules. The illuminated appearance of the light-emitting device will thus be able to be continuous. As a variant, it could be envisioned for these light-emitting modules to be perfectly separate from one another, and for them to be arranged in different and not necessarily contiguous locations in a light-emitting device. The illuminated appearance of this device could thus be discontinuous.

Advantageously, the first optical device is arranged so that the first light beam has an upper cutoff, in particular an upper cutoff of the low-beam type, and the second optical device is arranged so that the second light beam extends at least partially above said upper cutoff. Where appropriate, the first light beam may be intended to form all or part of a regulatory low beam and the second light beam may be intended to form all or part of a regulatory high beam.

Advantageously, the second optical device comprises a collector comprising a reflective surface arranged to collect and reflect the light emitted by the second light source and a lens arranged to project the light reflected by the collector, said second light beam being formed by an image of the reflective surface of the collector formed by said lens. Where appropriate, the deflecting member of the third optical device comprises a collector comprising a reflective surface arranged downstream of the collector of the second optical device and upstream of the lens of the second optical device.

For example, the reflective surface of the collector of the second optical device may have a parabolic or elliptical profile. Preferably, it is a surface of revolution of said profile. The revolution is about an axis that is advantageously parallel to an optical axis of said lens. According to one variant, the reflective surface is a free-form surface or a swept surface or an asymmetric surface. It may also comprise a plurality of sectors.

Preferably, the second light source is placed at a focus of said reflective surface of the collector of the second optical device. Where appropriate, the light rays reflected by the reflective surface along the rear edge are parallel to the optical axis of said lens or have in a vertical plane an angle of inclination smaller than or equal to 25°, and preferably smaller than or equal to 10°, with respect to said optical axis.

Preferably, the lens has a focal zone located on the reflective surface of the collector of the second optical device so that the second light beam contains a spot of maximum brightness corresponding to the position of this focal zone with respect to the reflective surface.

Advantageously, the third light source is somewhat distant from the second light source, it for example being placed downstream of the second light source. Where appropriate, the deflecting member is arranged so as to not or not substantially deflect the light emitted by the third light source directly toward said lens of the second optical device.

In one embodiment of the invention, the second and third light sources, and optionally the first light source, are mounted on the same support, and in particular on the same printed circuit board, and are able to emit light rays in the same direction. Where appropriate, the collector of the third optical device is arranged downstream and above the collector of the second optical device, each of these collectors defining a cavity oriented toward one or other of the second and third light sources. For example, the second and third light sources, and optionally the first light source, are light-emitting semiconductor chips, and in particular light-emitting diodes.

Advantageously, the collector of the deflecting member comprises scattering elements. Said scattering elements will potentially comprise one of the following scattering elements or a combination of the following scattering elements: a graining, a texture produced by glass-bead blasting, a texture produced by sand blasting, striations, grooves, or any type of local deformation of the reflective surface of the collector of the deflecting member produced via physical or chemical modification of this reflective surface or even by adding scattering material to this reflective surface and capable of scattering a ray of light interacting with this local deformation. According to one example of embodiment of the invention, the reflective surface of the collector of the deflecting member may be grained by firing a laser beam against this reflective surface.

In one embodiment of the invention, the third optical device comprises a plurality of scattering surfaces together defining a volume of the second light-emitting module through which light reflected by the reflective surface of the collector of the second optical device is intended to propagate to the lens of the second optical device. Where appropriate, said volume is obstructed by the lens of the second device. According to this feature, the light emitted by the third light source and deflected by the deflecting member is scattered by the scattering surfaces in this volume, for example until it reaches the lens of the second optical device.

Advantageously, the second light-emitting module comprises a cover forming an upper scattering surface, the latter being arranged in the extension of the collector of the deflecting member and extending to the lens of the second optical device.

Also advantageously, the second light-emitting module has two side walls arranged on either side of the collectors of the second optical device and of the deflecting member and each forming a lateral scattering surface. These side walls for example form splitters that distribute the second light-emitting module to other light-emitting modules of the light-emitting device that are arranged on either side of this second light-emitting module, for example modules such as the first light-emitting module or another light-emitting module similar to the second light-emitting module. Where appropriate, each side wall extends to the lens of the second optical device.

Also advantageously, the second light-emitting module comprises a plate bearing, in particular directly or indirectly, the second and third light sources, the plate comprising a wall extending to the lens of the second optical device and forming a lower scattering surface. The plate may for example be a heat sink bearing a printed circuit board on which the second and third light sources are mounted.

Preferably, said plate comprises a blocking element that protrudes from the plate and that is arranged between the third light source and the lens of the second optical device. This blocking element makes it possible, inter alia, to intercept rays of light emitted directly by the third light source in the direction of said lens, i.e. rays that are not reflected or scattered before reaching said lens, and that would be liable to generate discomfort glare.

Advantageously, each scattering surface comprises scattering elements. According to one example of embodiment of the invention, each scattering surface of the collector of the deflecting member may be grained or sand blasted, and have striations. These striations in particular have the advantage of multiplying the number of times the light rays emitted by the third light source, into the volume defined by the scattering surfaces, are reflected, and therefore scattered, before reaching the lens of the second optical device.

In one embodiment of the invention, the first optical device comprises a collector comprising a reflective surface arranged to collect and reflect the light emitted by the first light source and a lens arranged to project the light reflected by said collector, said first light beam being formed by an image of the reflective surface of said collector formed by said lens.

For example, the collector of the first optical device may have a rear edge and the lens of the first optical device may have a focal zone located in the vicinity of said rear edge of the collector so that the first light beam contains an upper cutoff formed by the image of the rear edge of this collector formed by said lens. Where appropriate, the first and second light-emitting modules may be arranged so that the second beam extends at least partially above said upper cutoff.

Preferably, the lens of the first optical device and the lens of the second optical device are each formed by a segment of the same lens, in particular a toric lens.

Advantageously, the first optical device comprises a plurality of scattering surfaces together defining a volume of the first light-emitting module through which light reflected by the reflective surface of the collector of the first optical device is intended to propagate to the lens of the first optical device. These scattering surfaces in particular make it possible to prevent light rays, called stray rays, emitted by the first light source, and liable to reach these surfaces, from being reflected thereby toward the lens of the first optical device so as to be projected in a manner such as to cause discomfort glare, in particular through projection above said upper cutoff.

Advantageously, the control unit is able to receive an instruction to emit a given photometric function, and is arranged to simultaneously control turn on of the first light source and turn on of either of the second and third light sources.

BRIEF DESCRIPTION OF DRAWINGS

The present invention will now be described using examples that are merely illustrative and in no way limit the scope of the invention, and with reference to the appended drawings, in which drawings the various figures show.

DETAILED DESCRIPTION OF THE INVENTION

In the following description, elements that are identical, in structure or function, and that appear in more than one figure, have been designated by the same reference signs, unless otherwise indicated.

Figure 1:
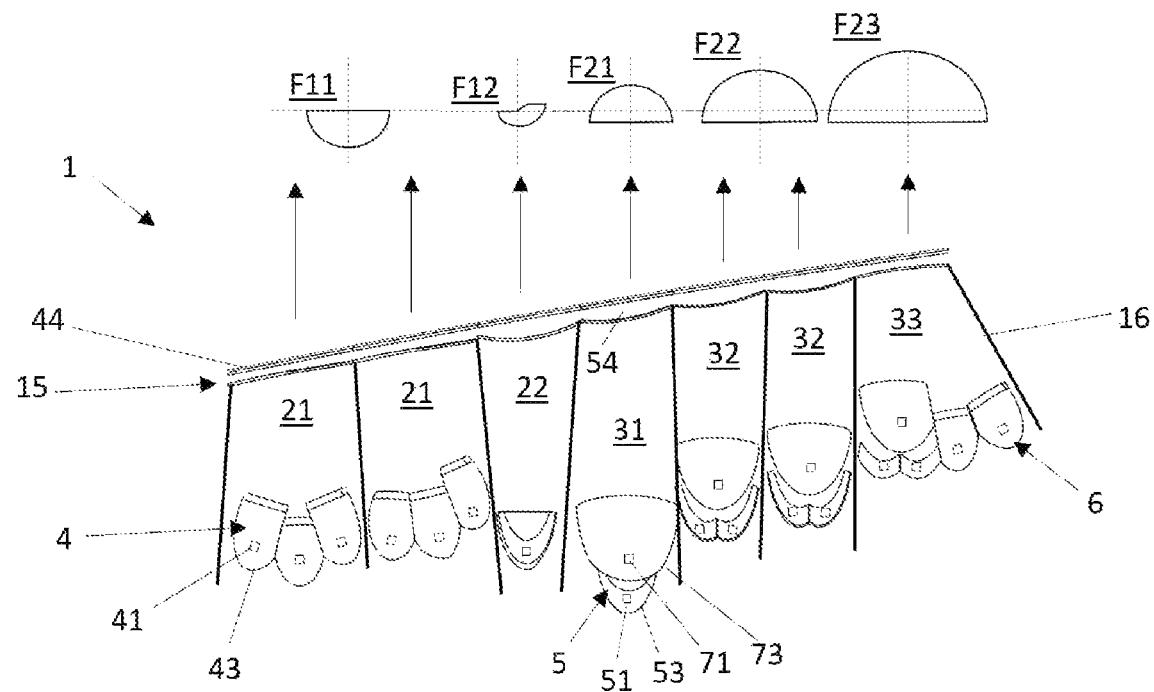
FIG. 1 schematically and partially shows a top view of a light-emitting device according to one embodiment of the invention.

FIG. 1 shows a bottom view of a lighting device 1 according to one embodiment of the invention.

The lighting device 1 comprises a plurality of light-emitting modules including first light-emitting modules 21 and 22 and second light-emitting modules 31, 32 and 33.

In the described example, the first light-emitting modules 21 each comprise three sub-modules 4 each provided with a first light source 41, formed by a light-emitting diode, and with an optical device 42, comprising a collector 43 provided with a reflective surface and a lens 44. It will be noted that the lens 44 is common to all the sub-modules 4 of the same light-emitting module 21.

Figure 2:
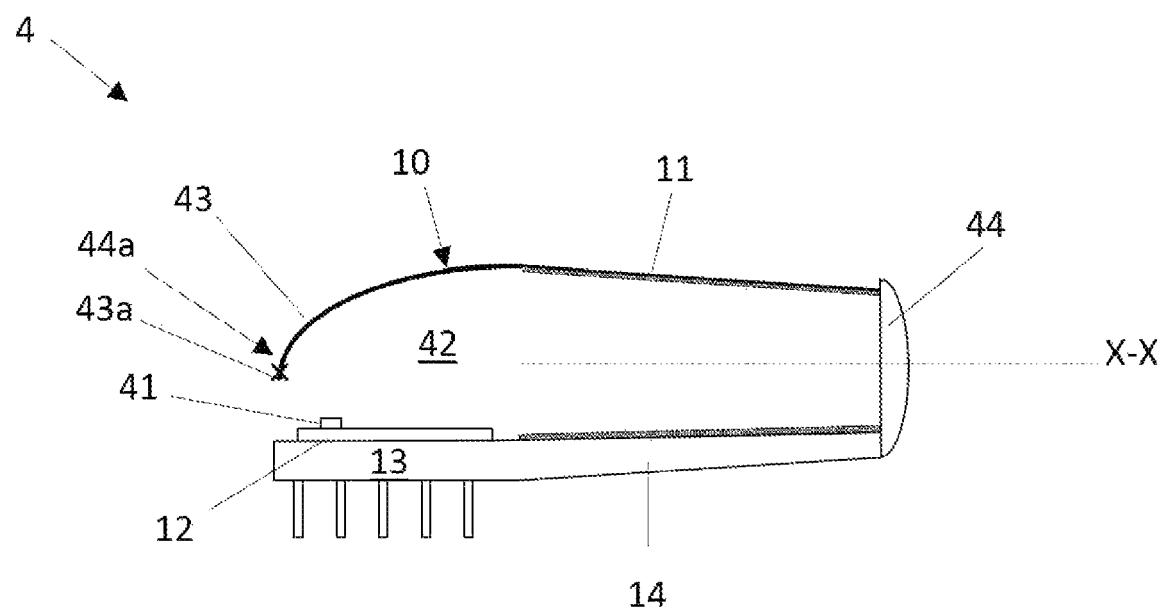
FIG. 2 schematically and partially depicts a cross-sectional view of a first light-emitting module of the device of FIG. 1.

FIG. 2 shows a cross-sectional view of a sub-module 4 of one of the first light-emitting modules 21, the cross section being cut in a vertical plane.

The collector 43 has, vertically, a truncated parabolic profile defining a cavity in which the light-emitting diode 41 is arranged. More precisely, the light-emitting diode 41 is placed at a focus of this collector 43, so that the light rays emitted by this light-emitting diode 41 are reflected by the reflective surface of the collector 43 at an angle of inclination, with respect to an optical axis X-X of the lens 44, smaller than or equal to 25°, and preferably smaller than 10°.

The reflective surface of the collector 43 collects light emitted by the light-emitting diode 41 and reflects it toward the lens 44, which is arranged to project this light onto the road. The first light-emitting module 21 thus forms a first light beam F11.

The collector 43 thus has a rear edge 43a. The lens 44 has a focal zone, a focal line 44a for example, passing through this rear edge 43a, so that this lens 44 projects the image of the collector 43 onto the road and so that the light beam F11 resulting from this projection has an upper cutoff, demarcating an illuminated zone from an unilluminated zone, formed by this rear edge 43a.

In the case of the sub-module 4, the rear edge 43a has a substantially elliptical profile, and hence the upper cutoff of the first light beam F11 is substantially flat.

It will be noted that the focal line 44a of the lens 44 is curved, and thus passes through all the rear edges 43a of the collectors 43 of the sub-modules 4 of the same light-emitting module 21.

The first light-emitting module 22 comprises a single sub-module 4 that is the same as the sub-modules 4 of the first light-emitting modules 21, with the exception of the shape of the collector of this sub-module and in particular of the profile of its rear edge, which is a substantially elliptical profile in which an indent is formed. The upper cutoff of the first light beam F12, resulting from projection by the lens of an image of the collector of this sub-module 4, thus contains a protrusion, which is intended to extend above the substantially flat upper cutoff of the first light beams F11.

The combination of the two first light beams F11 and of the first light beam F12 thus forms a regulatory low beam.

The second light-emitting module 31 comprises a single sub-module 5 comprising a second light source 51, formed by a light-emitting diode, and a second optical device 52, comprising a collector 53 provided with a reflective surface and a lens 54.

Figure 3:
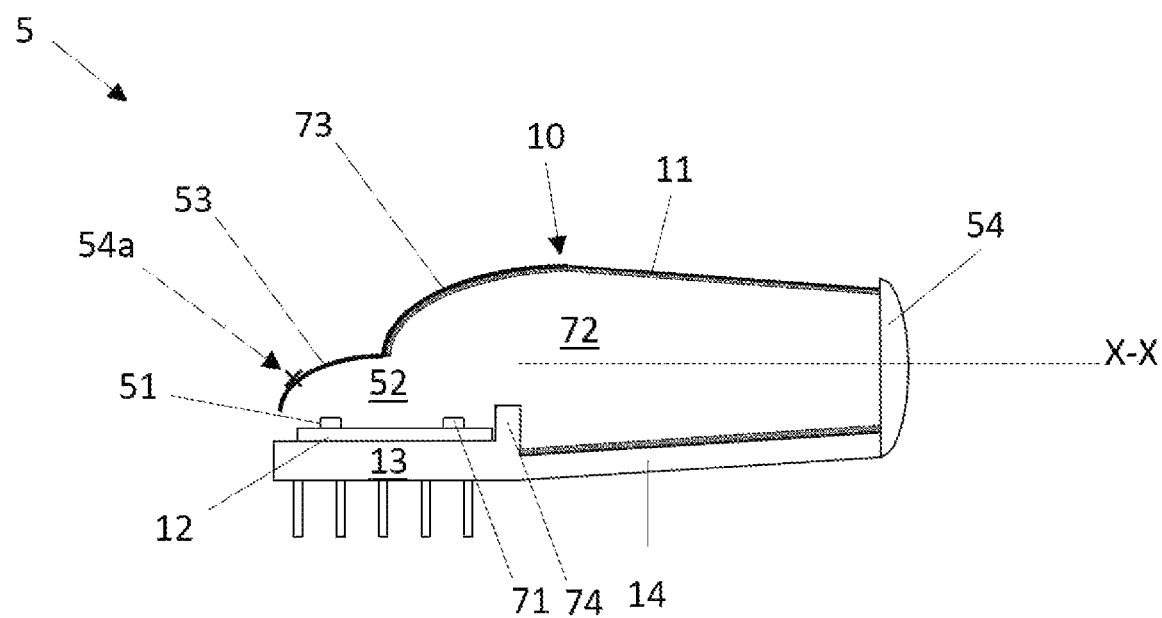
FIG. 3 schematically and partially depicts a cross-sectional view of a second light-emitting module of the device of FIG. 1.

FIG. 3 shows a cross-sectional view of the sub-module 5 of this second light-emitting module 31, the cross section being cut in a vertical plane.

The collector 53 has, vertically, a truncated parabolic profile defining a cavity in which the light-emitting diode 51 is arranged. More precisely, the light-emitting diode 51 is placed at a focus of this collector 53, so that the light rays emitted by this light-emitting diode 51 are reflected by the reflective surface of the collector 53 at an angle of inclination, with respect to an optical axis X-X of the lens 54, smaller than or equal to 25°, and preferably smaller than 10°.

The reflective surface of the collector 53 collects light emitted by the light-emitting diode 51 and reflects it toward the lens 54, which is arranged to project this light onto the road. The second light-emitting module 31 thus forms a second light beam F21.

The lens 54 has a focal zone, a focus 54a for example, located at a given point on the reflective surface of the collector 53, so that this lens projects the image of the collector 53 onto the road and so that the light beam F21 resulting from this projection has a spot of maximum brightness the position of which corresponds to the position of this focus 54a with respect to this reflective surface and in particular to its outline.

The lens 54 thus projects this second light beam F21 so that it extends at least partially above the upper cutoffs of the first light beams F11 and F12.

The second light-emitting modules 32 comprise two sub-modules 5, each the same as the sub-module 5 of the second light-emitting module 31, with the exception of the shape of the collector of these sub-modules, which make it possible to obtain a second light beam F22 that is larger, both horizontally and vertically, than the second light beam F21. It will be noted that the lens is common to all the sub-modules 5 of the same light-emitting module 32.

Lastly, the second light-emitting module 33 comprises two sub-modules 5, each the same as the sub-module 5 of the second light-emitting module 31, with the exception of the shape of the collector of these sub-modules, which make it possible to obtain a second light beam F23 that is larger, both horizontally and vertically, than the second light beam F22, and two sub-modules 6 that are intended to form beams extending on either side of the second light beam F23. It will be noted that the lens is common to all the sub-modules 5 and 6 of this light-emitting module 33.

The combination of the first light beams F11 and F12 and of the second light beams F21, F22 and F23 thus forms a regulatory high beam.

In the described example, all of the collectors 43, 53 of the sub-modules 4, 5 and 6 of the light-emitting modules 21, 22, 31, 32 and 33 form a single part 10 provided with metallized cavities forming the reflective surfaces of these collectors. The single part 10 forms a cover of the lighting device 1, a wall 11 of this cover thus extending from the collectors to the lenses.

Moreover, the light-emitting diodes 41, 51 of the sub-modules 4, 5 and 6 of the light-emitting modules 21, 22, 31, 32 and 33 are mounted on a common support 12, in particular a common printed circuit board, that is attached to a metal plate 13 forming a heat sink in particular for the heat generated by these light-emitting diodes, and therefore provided with fins for this purpose. A wall 14 of this plate extends from these fins to the lenses. The single part 10 is attached to this plate 13 so as to form a housing of the light-emitting device 1, which can thus be integrated into a headlamp of a motor vehicle.

The lenses 44, 54 of the sub-modules 4, 5 and 6 of the light-emitting modules 21, 22, 31, 32 and 33 form a single part 15, namely a toric lens, which is fastened between the single part 10 and the plate 13 to form an exit face for light from the light-emitting device 1.

Lastly, the light-emitting device 1 comprises a plurality of side walls 16 each defining a splitter for two adjacent light-emitting modules.

It will be noted that for each light-emitting module, the upper, lower and side walls 11, 14, 16 define a volume of this light-emitting module through which the light reflected by the one or more collectors 43, 53 propagates to the lens 44, 54.

In the described example, each of the second light-emitting modules 31, 32 and 33 comprises a third light source 71, formed by a light-emitting diode, and a third optical device 72, comprising a collector 73 provided with a reflective surface and these upper, lower and side walls 11, 14, 16.

These upper, lower and side walls 11, 14, 16 comprise scattering elements. For example, each of these upper, lower and side walls 11, 14, 16 has been grained or sandblasted over its entire length, and is further provided with striations extending along a transverse axis of the light-emitting module.

Each third light source 71 is mounted on the support 12, downstream of the one or more second light sources 51 and thus emits light in the same direction as the first and second light sources 41, 51. For each second light-emitting module 31, 32, 33, the collector 73 is thus arranged downstream and above the one or more collectors 53 of this second module and upstream of the lens 54 of this second module. It will also be noted that the collectors 73 are formed by cavities formed in the single part 10.

For each second light-emitting module 31, 32 and 33, the reflective surface of the collector 73 reflects the light emitted by the light-emitting diode 71 toward one of the upper, lower and side walls 11, 14, 16, which scatters this light toward the lens 54 or toward an-other of these walls.

The light emitted by the third light source 71 is thus uniformly scattered toward the entire surface of the lens 54, which thus exhibits a uniform illuminated appearance when this third light source 71 is turned on. Moreover, the fact that this light is scattered by the upper, lower and side walls 11, 14, 16 makes it possible to reduce the brightness of this light and prevents it from causing discomfort glare to another road user.

In order to increase scattering of this light emitted by the third light source, the reflective surface of the collector 73 may also be provided with scattering elements, such as a graining for example.

It will be noted that each second light-emitting module 31, 32 and 33 comprises a blocking element 74 that protrudes from the plate 13 downstream of the third light source 71, this blocking element intercepting rays of light that are emitted by this third light source 71 directly toward the lens 54 and that would therefore be liable to generate discomfort glare.

Lastly, with regard to the first light-emitting modules 21 and 22, the upper, lower and side walls 11, 14, 16 also comprise scattering elements, which are in this case intended to scatter stray rays emitted by the first light sources 41.

The light-emitting device comprises a control unit (not shown) that is able to receive an instruction to emit a given photometric function, and that is arranged, in response to this instruction, to control the first, second and third light sources 41, 51 and 71 so that they emit light.

For example, on receipt of an instruction to emit a low-beam function, the control unit activates the first light sources 41 with a view to emission of the first light beams F11 and F12, the light-emitting device then performing said low-beam function. The control unit also activates the third light sources 71 while leaving the second light sources 51 off, the lenses 44 and 54, and therefore the lens 15, then having an illuminated and uniform appearance.

On receipt of an instruction to emit a high-beam function, the control unit activates the first light sources 41 with a view to emission of the first light beams F11 and F12, and the second light sources 51 with a view to emission of the second light beams F21, F22 and F23. The light-emitting device then performs said high-beam function and the lenses 44 and 54, and therefore the lens 15, still have the same illuminated and uniform appearance.

The above description clearly explains how the invention allows the objectives that were set therefor to be achieved, namely obtainment of a light-emitting device the illuminated appearance of which is uniform and constant whatever its operating mode, without loss of efficiency in respect of its constituent light-emitting modules, by making provision to add, to one of these light-emitting modules, a light source and an optical device dedicated to this illuminated appearance.

In any event, the invention is not limited to the embodiments specifically described in this document, and extends, in particular, to any equivalent means and to any technically operational combination of these means. It is for example possible to envision types of optical device other than the one described, and in particular any optical device comprising one or a combination of a plurality of the following optical elements: reflector, lens, collimator, optical guide, shield. It is also possible to envision the light beams having other profiles and/or other dimensions and/or being positioned otherwise.

What is claimed is:

1. A light-emitting device of a motor vehicle, the device comprising a first light-emitting module and a second light-emitting module, in which the first light-emitting module includes a first light source and a first optical device arranged to receive light emitted by the first light source and to form, from this light, a first light beam, and in which the second light-emitting module includes a second light source and a second optical device arranged to receive light emitted by the second light source and to form, from this light, a second light beam distinct from the first beam, with the second light-emitting module includes a third light source and a third optical device including a deflector and at least one scattering surface, the deflector being arranged to receive light emitted by the third light source and to deflect that light toward the scattering surface, the light-emitting device including a control unit arranged to control each of the light sources and to turn on the third light source when the first light source is turned on.

2. The light-emitting device as claimed in claim 1, wherein the second optical device includes a collector having a reflective surface arranged to collect and reflect light emitted by the second light source and a lens arranged to project light reflected by the collector, the second light beam being formed by an image of the reflective surface of the collector formed by the lens and wherein the deflector of the third optical device includes a collector having a reflective surface arranged downstream of the collector of the second optical device and upstream of the lens the second optical device.

3. The light-emitting device as claimed in claim 2, wherein the collector of the deflector comprises scattering elements.

4. The light-emitting device as claimed in claim 2, wherein the third optical device includes a plurality of scattering surfaces together defining a volume of the second light-emitting module through which light reflected by the reflective surface of the collector of the second optical device is intended to propagate to the lens of the second optical device.

5. The light-emitting device as claimed in claim 4, wherein the second light-emitting module includes a cover forming an upper scattering surface, the latter being arranged in the extension of the collector of the deflector and extending to the lens of the second optical device.

6. The light-emitting device as claimed in claim 4, wherein the second light-emitting module has two side walls arranged on either side of the collectors of the second optical device and of the deflector and each forming a lateral scattering surface.

7. The light-emitting device as claimed in claim 4, wherein the second light-emitting module includes a plate bearing the second and third light sources, the plate having a wall extending to the lens of the second optical device and forming a lower scattering surface.

8. The light-emitting device as claimed in claim 7, wherein the plate includes a blocking element that protrudes from the plate and that is arranged between the third light source and the lens of the second optical device.

9. The light-emitting device as claimed in claim 4, wherein each scattering surface includes scattering elements.

10. The light-emitting device as claimed in claim 2, wherein the first optical device includes a collector includes a reflective surface arranged to collect and reflect light emitted by the first light source and a lens arranged to project light reflected by the collector, the first light beam being formed by an image of the reflective surface of the collector formed by the lens.

11. The light-emitting device as claimed in claim 10, wherein the first optical device includes a plurality of scattering surfaces together defining a volume of the first light-emitting module through which light reflected from the reflective surface of the collector of the first optical device is intended to propagate to the lens of the first optical device.

12. The light-emitting device as claimed in claim 1, wherein the first light beam is intended to form all or part of a regulatory low beam and wherein the second light beam is intended to form all or part of a regulatory high beam.

* * * * *